(12) United States Patent
Ziegler et al.

(10) Patent No.: US 6,304,932 B1
(45) Date of Patent: Oct. 16, 2001

(54) QUEUE-BASED PREDICTIVE FLOW CONTROL MECHANISM WITH INDIRECT DETERMINATION OF QUEUE FULLNESS

(75) Inventors: Michael L. Ziegler, Whitinsville, MA (US); Robert J. Brooks, Roseville; William R. Bryg, Saratoga, both of CA (US); Craig R. Frink, Chelmsford; Thomas R. Hotchkiss, Groton, both of MA (US); Robert D. Odineal, Roseville, CA (US); James B. Williams, Lowell, MA (US); John L. Wood, Rochester, NH (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/697,560

(22) Filed: Oct. 25, 2000

Related U.S. Application Data

(63) Continuation of application No. 08/201,185, filed on Feb. 24, 1994, now Pat. No. 6,182,176.

(51) Int. Cl.[7] .................................................. G06F 13/14
(52) U.S. Cl. ............................................. 710/112; 710/113
(58) Field of Search .................................. 710/112, 113, 710/114, 115, 116, 117, 118

(56) References Cited

U.S. PATENT DOCUMENTS 5,265,235 * 11/1993 Sindhu et al. ........................ 711/120

* cited by examiner

Primary Examiner—Richard L. Ellis

(57) ABSTRACT

A shared bus system having a bus and a set of client modules coupled to the bus. Each client module is capable of sending transactions on the bus to other client modules and receiving transactions on the bus from other client modules for processing. Each module has a queue for storing transactions received by the module for processing. A bus controller limits the types of transactions that can be sent on the bus to prevent any module's queue from overflowing.

3 Claims, 2 Drawing Sheets

QUEUE-BASED PREDICTIVE FLOW CONTROL MECHANISM WITH INDIRECT DETERMINATION OF QUEUE FULLNESS

CROSS REFERENCE TO RELATED APPLICATION

This is a continuation of application Ser. No. 08/201,185 filed on Feb. 24, 1994 now U.S. Pat. No. 6,182,176

FIELD OF THE INVENTION

The present invention relates to computer systems that have a shared bus, and more particularly to controlling transactions issued on a shared bus.

BACKGROUND OF THE INVENTION

Computer systems commonly have a plurality of components, such as processors, memory, and input/output devices, and a shared bus for transferring information among two or more of the components. Typically, the components are coupled to the bus in the form of component modules, each of which may contain one or more processors, memory, and/or input/output devices. Information is transmitted on the bus among component modules during bus cycles, each bus cycle being a period of time during which a selected module is permitted to transfer, or drive, a limited quantity of information on the bus. Modules commonly send transactions on the bus to other modules to perform operations such as reading and writing data.

One class of computer system has two or more main processor modules for executing software running on the system (or one or more processor modules and one or more coherent input/output modules) and a shared main memory that is used by all of the processors and coherent input/output modules in the system. The main memory is generally coupled to the bus through a main memory controller. In many cases, one or more processors also has a cache memory, which stores recently used data values for quick access by the processor.

Ordinarily, a cache memory stores both the frequently used data and the addresses where these data items are stored in main memory. When the processor seeks data from an address in memory, it requests that data from the cache memory using the address associated with the data. The cache memory checks to see whether it holds data associated with that address. If so, the cache memory returns the requested data directly to the processor. If the cache memory does not contain the desired information (i.e., a "cache miss" occurs), the cache requests the data from main memory and stalls the processor while it is waiting for the data. Since cache memory is faster than main RAM memory, this strategy results in improved system performance.

In the case of a shared memory multi-processor computer in which each processor has cache memory, the situation is somewhat more complex. In such a computer, the most current data may be stored in one or more cache memories, or in the main memory. Software executing on the processors must utilize the most current values for data associated with particular addresses. Thus, a "cache coherency scheme," must be implemented to assure that all copies of data for a particular address are the same.

In a typical write-back coherency scheme, when data is requested by a module, each module having cache memory performs a "coherency check" of its cache memory to determine whether it has data associated with the requested address and reports the results of its coherency check. Each module also generally reports the status of the data stored in its cache memory in relation to the data associated with the same address stored in main memory and other cache memories. For example, a module may report that its data is "private" (i.e., the data value is only usable by this module) or that the data is "shared" (i.e., the data may reside in more than one cache memory at the same time). A module may also report whether its data is "clean" (i.e., the same as the data associated with the same address stored in main memory) or "dirty" (i.e., the data has been changed after it was obtained).

The results of the coherency checks performed by each module are analyzed by a selected processor and the most current data is provided to the module that requested the data. A "coherent transaction" is any transaction that requires a check of other caches to see whether data associated with a memory address is stored in the other caches, or to verify that data is current. Most reads and some writes to memory are coherent transactions. Those skilled in the art are familiar with many types of coherent transactions, such as a conventional read private, and non-coherent transactions, such as a conventional write-back.

In many conventional coherency schemes, reporting the results of coherency checks requires a significant amount of communication between the modules and the coherency processor that makes the final decision on how a memory request is to be satisfied. Each module having a cache memory must be informed of a required coherency check and must report the result of its coherency check to the coherency processor. Even if the number of communications is reduced, conventional means of processing and reporting the results of coherency checks are often slow. Coherency checks must be carried out in a manner that does not substantially reduce the effective bandwidth of the shared bus used by the modules for the inter-module communications.

To reduce the impact of memory latency delays, many conventional buses are "split transaction" buses; that is, a transaction does not need to be processed immediately after it is placed on the bus. For example, after a memory read transaction is issued on the bus, the module that issued the read relinquishes the bus, allowing other modules to use the bus for other transactions. When the requested data is available, the responding module for the read obtains control of the bus, and then transmits the data. It is often possible for modules in a shared bus system to initiate transactions faster than they can be serviced by the responding module, or faster than coherency checks can be performed by the other modules. For example, input/output devices often operate at a much slower speed than microprocessors and, thus, modules connecting input/output devices to the bus may be slow to respond. Similarly, main memory accesses are relatively slow, and it is possible for the processor modules to request data faster than it can be read from the main memory. Cache coherency checks may also be slow because the coherency checking processors in a module may be busy with other operations. Thus, it is often necessary to either slow down initiation of new transactions by modules or to handle the overflow of transactions when too many transactions are initiated in too short a time for them to be adequately processed or for coherency checks to be performed.

A typical prior art method for dealing with transaction overflow uses a "busy-abort" mechanism to handle the situation in which too many transactions of some type are initiated too quickly. When the responding module for the transaction sees a new transaction request that it cannot respond to immediately, the responding module sends back a "busy-abort" signal indicating that the transaction cannot be serviced at that time (e.g., an input/output module is occupied or a processor module having a cache memory cannot perform a coherency check fast enough). The requesting module then aborts its request and tries again at a later time. This approach increases design complexity because the requesting module must retain the transaction information until all possibility of receiving a "busy-abort" response has passed. In addition, if two transactions must be executed in a particular order, the second transaction generally cannot be issued until all possibility of receiving a "busy-abort" response has passed. Finally, aborted transactions result in processing delays and waste bus time.

An alternative approach is to require handshaking between modules after each transaction to confirm whether a transaction can be processed by the responding module. This approach also results in processing delays and unnecessary design complexity.

Accordingly, there is a need for a means of handling multiple transactions that a computer system cannot immediately process without imposing unnecessary processing delays or design complexity on the system.

SUMMARY OF THE INVENTION

An object of the present invention is, therefore, to provide a flow control mechanism for a computer system that handles multiple transactions that cannot all be processed immediately without imposing unnecessary delays.

Another object of the present invention is to provide a flow control mechanism for a computer system that does not require the use of handshaking or busy/abort signals.

Still another object of the present invention is to provide a flow control mechanism for a computer system that handles multiple transactions that cannot all be processed immediately without imposing unnecessary design complexity on the system.

These and other objects of the present invention will become apparent to those skilled in the art from the following detailed description of the invention and preferred embodiments, the accompanying drawings, and the appended claims.

Broadly stated, the present invention is a shared bus system having a bus and a plurality of client modules coupled to the bus. Each of the client modules is capable of transmitting transactions on the bus to the other client modules and receiving transactions on the bus from the other client modules. Each module further has a queue for storing information specifying the transactions received by the module for processing by that module. The bus system also has a bus controller that has means for limiting the types of transactions sent on the bus. When a queue in one of the modules has less than a predetermined amount of free space, the bus controller limits transactions that may be sent on the bus so as to prevent transactions requiring space in that queue from being issued.

Each client module preferably has a cache memory, means for detecting coherent transactions transmitted on the bus and performing a coherency check of its cache memory for the transaction, and a coherency bus for reporting results of the coherency checks.

Each client module preferably has a coherency queue for storing coherent transactions detected on the bus until a coherency check is performed for the coherent transactions. The queues are large enough to accommodate typical transaction issue rates without the need to abort transactions.

The shared bus system preferably also has a main memory controller coupled to the bus. The main memory controller is coupled to each of the coherency lines for receiving the results of the coherency checks reported by the client modules. The main memory controller has a client option line for sending client option signals to each of the client modules to inform the client modules of what types of transactions are enabled to be transmitted on the bus during each cycle. The main memory tracks the number of coherent transactions stored in each of the coherency queues and sends client option signals that prevent transactions from being transmitted on the bus that would cause one of the coherency queues to overflow.

DETAILED DESCRIPTION OF THE INVENTION AND PREFERRED EMBODIMENTS

Figure 1:
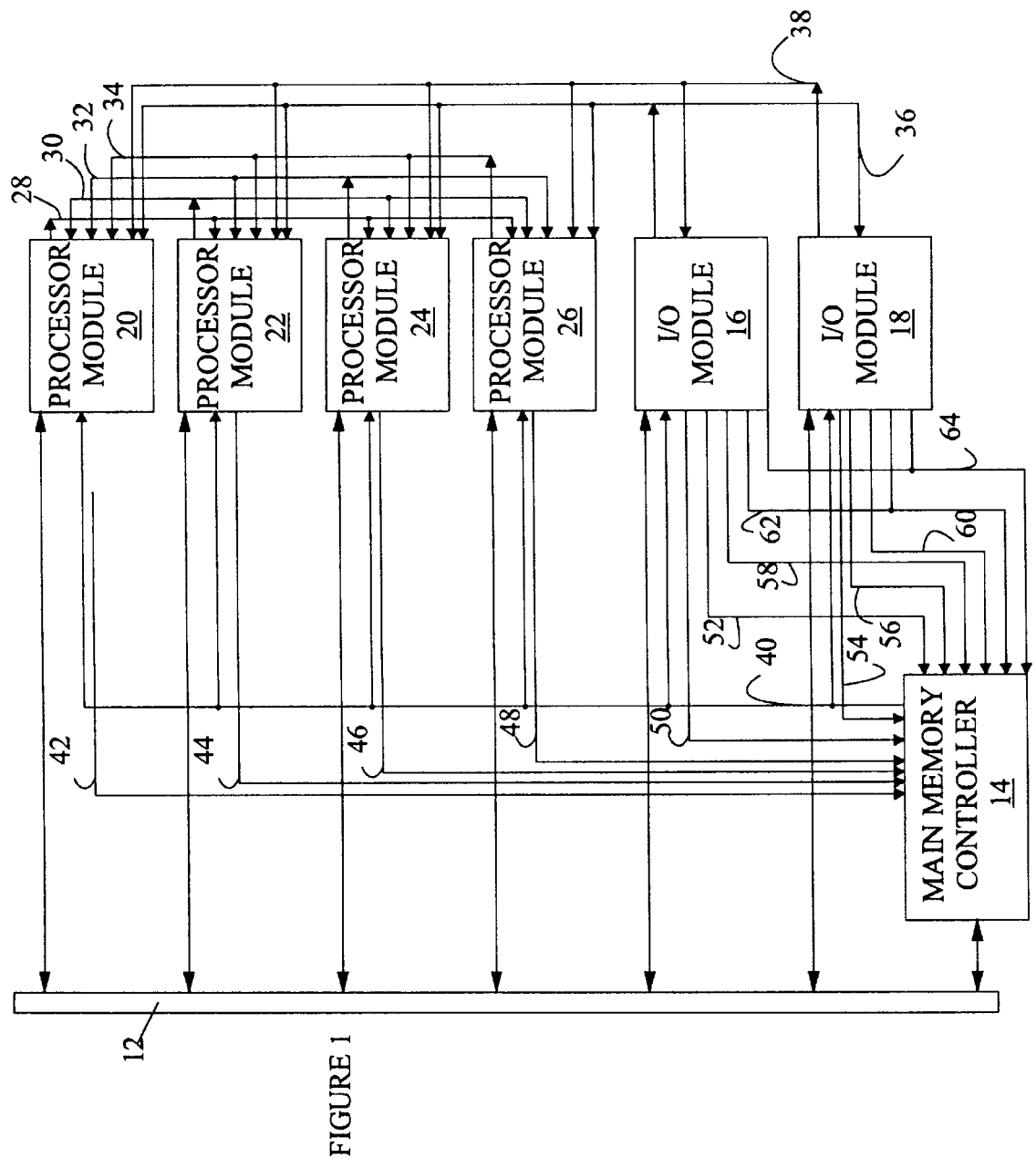
FIG. 1 is a block diagram illustrating one embodiment of a computer system for use with a flow control mechanism according to the present invention.

The present invention encompasses a predictive flow control mechanism that prevents transactions from being issued by component modules of a shared bus system when the transactions cannot be handled at that time. Thus, the present invention eliminates the need to abort such transactions after they have been issued. This is accomplished by sending signals to each module indicating what types of transactions are allowed on the bus during a given cycle, and disallowing any transactions that cannot be processed.

In order to achieve these results, the present invention first distributes the cache coherency checking load in a manner that reduces the amount of communication required between the memory system and the individual modules on the bus. Each processing module on the bus that must participate in coherency testing includes circuitry that monitors the bus (ie., it "snoops" or "eavesdrops" on the bus) and detects coherent transaction requests that require coherency checking by the module. Hence, the central memory processor is relieved of the task of sending cache coherency checking requests to the various modules. This also reduces the number of connections between the central memory processing system and the various modules.

Second, each of the modules on the bus that must participate in coherency checking includes a queue for storing cache coherency checking tasks that have not yet been completed. This buffering allows the cache coherency checking system to operate at a higher effective bandwidth. In addition, the queues assure that cache coherency checking transactions are not lost without requiring a handshaking or busy-abort protocol or hardware.

Finally, the central memory processing system monitors the state of the various queues and provides signals that restrict the types of transactions that are placed on the bus to assure that queue overflows do not occur. This transaction restriction system may also be used to assure that other types of transactions are not lost.

The predictive flow control mechanism utilizes three main sets of transaction queues. First, each module that has a cache memory has a cache coherency queue for holding coherent transactions that have been issued on the bus until a cache coherency check can be performed. Second, each input/output module has an input/output queue for holding input/output transactions until they can be processed. Input/output transactions include any transaction that requires reading data from or writing data to an input/output device. In a preferred implementation, certain memory addresses designate input/output locations, and transactions sent to these addresses are therefore known to be input/output transactions. Finally, the main memory controller has a memory queue for holding main memory read and write transactions until coherency checking is completed and they can be processed. All of the queues are designed to handle typical transaction issue rates without overflowing.

The main memory controller acts as a central location for receiving and processing information on the status of each of the queues. The main memory controller ensures that the queues do not overflow by sending "client option" signals to the modules indicating what types of transactions may be initiated on the bus. For example, if the input/output queues are full, the main memory controller will send a client option signal indicating that no input/output transactions are allowed. If a coherency queue is full, the main memory controller will disallow further transactions requiring coherency checks.

Different procedures are used to track the full/empty status of each type of queue. For cache coherency queues, each module having a cache memory monitors the bus for transactions that have been issued and stores coherent transactions in its coherency queue for coherency checks in a first-in first-out order. The results of coherency checks are reported to the main memory controller. The main memory controller also monitors the bus for and keeps track of coherent transactions, and also receives the results of the coherency checks performed by each module. The main memory controller can therefore know how full each module's cache coherency queue is by comparing the number of coherent transactions issued to the number of coherency check responses received from a given module. In the case of input/output queues, an input/output module sends a signal to the main memory controller when its input/output queue is critically full. The main memory controller may keep track of its own memory queue in any conventional manner.

The flow control mechanism is efficient in terms of hardware because the queues are used to handle typical transaction issue rates in any event, and are not added simply to support the flow control mechanism. Bus bandwidth is also preserved since transactions are only issued once, rather than multiple times, since a transaction is guaranteed to be accepted.

The predictive flow control mechanism is described in connection with a computer system 10 shown in FIG. 1. Before discussing the predictive flow control mechanism, the operation of computer system 10 will be described in detail. While the basic operation of computer system 10 is not central to the present invention, it is useful to describe it in some detail before describing the operation of the predictive flow control mechanism further.

Computer system 10 is a multiprocessor computer having a bus 12 and a plurality of components coupled to bus 12. The components include a main memory controller 14, input/output modules 16 and 18, and processor modules 20, 22, 24 and 26. The components send transactions to one another on bus 12.

As described more fully below, main memory controller 14 may be considered the "host" module and the remaining components may be considered "client modules." The main memory controller/host module sends client option signals to each client module specifying the types of transactions, if any, permitted on the bus during a given cycle. The bus owner during a given cycle can only initiate transactions of a type permitted by the client option signal governing that cycle. The bus owner during the next available cycle is also determined by arbitration based on the client option signals, along with arbitration signals from each of the client modules, and a signal sent by the current bus owner indicating whether it needs to return control of the bus.

Processor modules 20, 22, 24 and 26 are the main processors for computer system 10, and software for the system executes simultaneously on all processors. Processor modules 20, 22, 24 and 26 control arbitration signal transmission (i.e., ARB) lines 28, 30, 32 and 34, respectively, which coupled each module to the remaining processor modules. When a processor wants to use bus 12, it sends a predetermined signal to the other processor modules on its ARB line, which is used for arbitration to determine the bus owner during the next available bus cycle.

Input/output modules 16 and 18 serve as interfaces between computer system 10 and input/output devices (not shown). Input/output modules 16 and 18 each contain an input/output adaptor. Input/output modules 16 and 18 control ARB lines 36 and 38, respectively. When an input/output module wants to use bus 12, it sends a predetermined signal to the remaining client modules on its ARB line, which is used for arbitration.

Main memory controller 14 is responsible for reading information from the main memory (not shown) and storing information in the main memory in a conventional manner. Main memory controller 14 interfaces with memory either directly or through a conventional bus. As noted above, main memory controller 14 preferably also serves as the host module for purposes of bus control. Main memory controller 14 controls a CLIENT_OP line 40, which is coupled directly to each client module. Main memory controller 14 sends signals to each client module on CLIENT_OP line 40 to indicate what types of transactions may be placed on bus 12 during the next available bus cycle.

Bus 12 is a high performance processor-memory-I/O interconnect bus. Bus 12 is a split transaction bus. For example, after a READ transaction is issued on bus 12, the module that issued the READ relinquishes the bus allowing other modules to use the bus for other transactions. When the requested data is available, the responding module for the READ arbitrates for the bus, and then transmits the data. WRITE transactions are not split, so the master transmits the WRITE data immediately following the address cycle.

Bus 12 preferably includes at least three buses that are primarily related to data transmission: an ADDR_DATA bus, a MASTER_ID bus, and a TRANS_ID bus. Bus 12 also includes a LONG_TRANS bus, which is related to arbitration for control of bus 12.

The ADDR_DATA bus is used for transmission of address information and data. Cycles where the ADDR_DATA bus carries address-related information are referred to as address cycles and cycles where the ADDR_DATA bus carries data is referred to as data cycles. Write transactions, for example, generally have a single address cycle followed immediately by one or more data cycles. The bus owner initiates a write transaction indicating the address to which it desires to write data and sends data during the succeeding cycles. Read transactions generally have a single address cycle used by the bus owner to indicate the address sought to be read. This address cycle is followed at some later time by one or more data cycles in which data is sent to the requesting module by he module responding to the request. Idle cycles may also occur in which no address-related information or data is sent.

The MASTER_ID and TRANS_ID buses are used together so that return data for a split transaction can be uniquely associated with the original transaction. Each split transaction is identified by a MASTER_ID signal on the MASTER_ID bus and a TRANS_ID signal on the TRANS_ID bus that, respectively, identify the module issuing the transaction and distinguish the transaction from other transactions sent by that module. For example, a split transaction "read" is sent with a unique combination of a MASTER_ID signal and a TRANS_ID signal. The MASTER_ID and TRANS_ID then accompany the return of the requested data, so that the returned data is received by the requesting module and correlated with the appropriate transaction. This mechanism allows transaction returns to come back in an order other than the order in which they were issued, because the transaction order is not critical to identification of transactions. To allow unique identification, only one transaction with a given transaction ID may be outstanding from a module at a given time. The same transaction ID may, however, be used by two or more separate modules simultaneously, since the transaction can be differentiated by the MASTER_ID.

LONG_TRANS is used by the current bus owner to retain control of bus 12 until a long transaction is completed. For example, a module may need to write a large amount of data during a series of cycles. When LONG_TRANS is asserted, other transactions cannot be inserted into the middle of the data by higher priority clients or the host, as explained further below.

In a preferred embodiment, the CLIENT_OP bus supports the signals shown in Table 1.

TABLE 1

| Name | Value | Meaning |
| --- | --- | --- |
| SHAR_RTN | 000 | Host controls bus 12 for shared return during relevant cycle |
| HOST_CONTROL | 001 | Host controls bus 12 during relevant cycle |
| NONE_ALLOWED | 010 | No trans allowed during relevant cycle, but clients still control bus 12. |
| ONE_CYCLE | 011 | One cycle trans allowed during relevant cycle |
| RET_ONLY | 100 | Return or response trans allowed during relevant cycle |
| NO_IO | 101 | Any except I/O trans allowed during revelant cycle |
| ATOMIC | 110 | Client who is "atomic owner" can issue any transaction, other clients can issue only responses, during relevant cycle. |
| ANY_TRANS | 111 | Any transaction allowed during relevant cycle |

The ANY_TRANS, HOST_CONTROL, ONE_CYCLE, and NONE_ALLOWED client option signals are relatively straightforward. A CLIENT_OP of ANY_TRANS indicates that any transaction is allowed during the relevant cycle. A CLIENT_OP of HOST_CONTROL indicates that the host seeks control of the bus during the relevant cycle. The ONE_CYCLE client option signal indicates that only a one-cycle transactions are allowed. The NONE_ALLOWED client option signal is used to indicate that no transactions are allowed.

The RET_ONLY client option signal indicates that only returns (write-backs) of previously held private-dirty cache lines, or responses to previous transactions are allowed. For example, if processor 24 issues a coherent read of a cache line that is private-dirty in processor 20's cache, processor 20 can supply that cache line in a cache-to-cache copy. That cache-to-cache copy transaction can be initiated under the influence of a RET_ONLY client option signal, since the cache-to-cache copy is a response to the coherent read. Similarly, I/O module 16 can return data from an earlier I/O read transaction under the influence of a RET_ONLY client option signal, since the data return is a response to the I/O read transaction.

The NO_IO and ATOMIC client option signals relate to input/output modules 16 and 18. As shown in FIG. 1, input/output modules 16 and 18 preferably control STOP_IO lines 58 and 60, respectively, for sending signals to memory controller 14 indicating that the modules cannot accept any more input/output transactions. Input/output modules 16 and 18 also preferably control STOP_MOST lines 62 and 64, respectively, for sending signals to memory controller 14 and to each other to take effective control of the memory system.

As explained more fully below, when the host receives a STOP_IO signal, the host will then assert a NO_IO client option signal. If the CLIENT_OP is NO_IO, all transactions except I/O transactions are allowed. The ATOMIC CLIENT_OP is generated in direct response to a client asserting STOP_MOST, assuming flow control would normally allow ANY_TRANS. The ATOMIC CLIENT_OP allows the client asserting STOP_MOST to perform several consecutive transactions on bus 12. All other clients are only allowed to respond to earlier sent transactions, or write back previously held private-dirty cache lines, if they obtain the bus during any cycle in which ATOMIC is asserted. The host may also ordinarily limit all clients to response-type transactions using the RET_ONLY client option signal. Thus, when there is an atomic owner, the effective client option signal for the atomic owner is ANY_TRANS and the effective client option signal for all other clients is RET_ONLY. It will be appreciated that the ATOMIC client option signal is not necessary to the present invention.

The SHAR_RTN client option signal is used in some embodiments in relation to coherency schemes for systems where each module has a cache memory. Each client module (both processor and input/output) has a cache memory and controls at least one coherent transaction signal transmission line (i.e., a COH lines) for sending signals directly to memory controller 14 that allow memory controller 14 to coordinate coherent transactions involving reads or writes of data that may be stored in one or more cache memories, so that most current data is used by the processors. Processor modules 20, 22, 24 and 26 control COH lines 42, 44, 46 and 48, respectively. Input/output module 16 controls COH lines 50 and 52. Input/output module 18 controls COH lines 54 and 56. The SHAR_RTN signal indicates that the main memory controller will be returning data having a shared status.

Turning now to a description of the predictive flow control mechanism, as noted above, three main sets of transaction queues are used to handle typical transaction rates. Main memory controller 14 monitors the full/empty status of each of the queues and issues client option signals that prevent the queues from overflowing. The three types of queues used in computer system 10 are described below, and then the means by which main memory controller 14 keeps track of the full/empty status of the queues. Finally, use of this information to generate appropriate client option signals will be explained.

The three types of queues are now described. First, each input/output ("I/O") module has an input/output queue, which holds transactions directed from bus 12 to the input/output module for transmission to an I/O device or an I/O bus. Processor reads and writes directed to I/O devices will wait in the I/O queue until the transaction can be processed on the I/O bus and/or I/O device. Such queues are commonly necessary to handle the rate at which transactions can be transmitted on bus 12. Typically, bus 12 will have a frequency of 60–120 MHz, while an I/O bus will have frequency of less than 20 MHz. Thus, transactions can be delivered to I/O modules much faster than they can be processed by the I/O bus or I/O device.

Second, main memory controller 14 has one or more memory queues for holding main memory read and write transactions. These memory-related transactions are stored in a memory queue until the read or write is performed in memory. Preferably, separate queues are used for reads and writes. A coherent read or write cannot be performed until coherency checking is completed.

Finally, each module that has a cache memory, including both processor and input/output modules, has a cache coherency queue for storing coherent transactions in a first-in first-out ("FIFO") order. A coherent transaction is any transaction (such as a read) that results in the need to check other caches to see whether the requested data is in the other cache, or to verify that the cache is up-to-date. Such transactions are indicated by signals sent during the address cycle for the transactions initiated on bus 12. Each module having a cache memory monitors the bus and loads coherent transaction into its cache coherency queue, referred to herein as CCC queues. The coherent transactions wait in the CCC queue of a particular module until that module checks its cache, and reports the results of that coherency check to main memory controller 14. In a preferred implementation, main memory controller 14 begins reading the main memory as soon as the read transaction has been issued. Main memory controller 14 waits until the results of the coherency checks are reported by all of the modules, and then responds to the coherent transaction. If no client module has a private-dirty copy of the data, main memory controller 14 will supply the data from main memory. Otherwise, the client module that has a private-dirty copy will supply the data and main memory controller 14 will update main memory with the new data value. In a preferred implementation, coherency responses are received by main memory controller 14 quickly enough so that there is no appreciable delay in responding to the transaction.

Main memory controller 14 serves as a central location for receiving and processing information on the current full/empty status of all queues: the memory queues, the CCC queues, and the I/O queues. Different procedures are used to track each type of queue, as explained further below.

With respect to its internal main memory queues, main memory controller 14, internally keeps track of how full its memory queues are. This can be done in any conventional manner.

With respect to I/O queues, each I/O module reports the status of its I/O queue to main memory controller 14. The I/O modules monitor their own I/O queues, and assert a dedicated STOP_IO signal to main memory controller 14 when their I/O queues are critically full. A queue is critically full if all remaining entries in the queue can be filled by new transactions, targeted for that queue and issued at the maximum allowed issue rate, in approximately the time required to notify all modules to stop issuing that type of transaction.

With respect to CCC queues, main memory controller 14 detects the number of coherent transactions issued on the bus and keeps track of how many coherent transactions each module has responded to, thereby indirectly monitoring the fullness of each module's CCC queue. More specifically, main memory controller 14 receives all coherent transactions as they are issued. As explained above, each module having a cache also receives each coherent transaction and sends the results of its cache coherency check for coherent transactions it has received to main memory controller 14. The responses are sent to main memory controller 14 on COH lines 42–52, which are dedicated buses from each module to main memory controller 14. Thus, main memory controller 14 can determine the number of coherent transactions remaining in a module's CCC queue by comparing cache coherency responses received from that module against the number of coherent transactions issued.

The process can be viewed as occurring on a "scoreboard." Coherent transactions are placed on the board when issued, indicating that the transaction is in each module's CCC queue. The main memory controller monitors the bus for such transactions. As main memory controller 14 receives the coherency response from each module on the COH lines, main memory controller 14 records the module's response and moves a pointer to the next CCC request to be processed by that module, and reduces by one the number of transactions listed as being in that module's CCC queue. Main memory controller 14 also knows when it has received all coherency responses for a given coherent transaction, so that it knows when and how to respond to the coherent transaction.

It will be recognized by those skilled in the art based on the present disclosure that, in lieu of a scoreboard, each module could assert a dedicated signal to main memory controller 14, similar to STOP_IO, but indicating that a CCC queue is critically full. The scoreboard approach, however, is more efficient in terms of hardware, since it utilizes coherency responses already being sent for purposes of the coherency scheme.

Based on the status of the various queues, main memory controller 14 uses the CLIENT_OP bus to prevent issuance of any transaction that would overload a queue. As explained above in connection with arbitration for bus 12, main memory controller 14, acting as host module, sends signals to all other modules on the CLIENT_OP bus indicating what types of transactions can be safely initiated. When a module wins arbitration for the bus, it checks what encoding was driven on the CLIENT_OP bus during the arbitration state to see what transactions (or returns) the arbitration winner can start. The possible CLIENT_OP signals are summarized in Table 1, above.

The CLIENT_OP signals directly related to flow control are ANY_TRANS, NO_IO, RET_ONLY, AND NONE_ALLOWED. If all queues have sufficient room, and main memory controller 14 is not trying to gain control of the bus, main memory controller 14 will drive the ANY_TRANS encoding, indicating that any type of transaction may be issued. If any I/O module is asserting its STOP_IO signal, main memory controller 14 will know that at least one I/O queue is critically full, and main memory controller 14 will drive the NO_IO encoding, indicating that any transaction except I/O transactions may be issued.

If main memory controller 14 detects that one or more CCC queues are critically full, or that its own memory queues cannot handle new read transactions, main memory controller 14 will drive the RET_ONLY encoding, indicating that the arbitration winner is only permitted to issue responses to earlier transactions or perform write backs of private dirty cache lines. In addition, new I/O transactions are disallowed.

If main memory controller 14 detects that its own memory queue cannot handle any new write transactions, it drives NONE_ALLOWED to prohibit starting new transactions. Since no new transactions are allowed, all queues are protected from overflowing. Internal memory processing will eventually relieve the memory queues, and cache coherency checking will eventually relieve the CCC queues, so a more permissive CLIENT_OP encoding can be issued.

Figure 2:
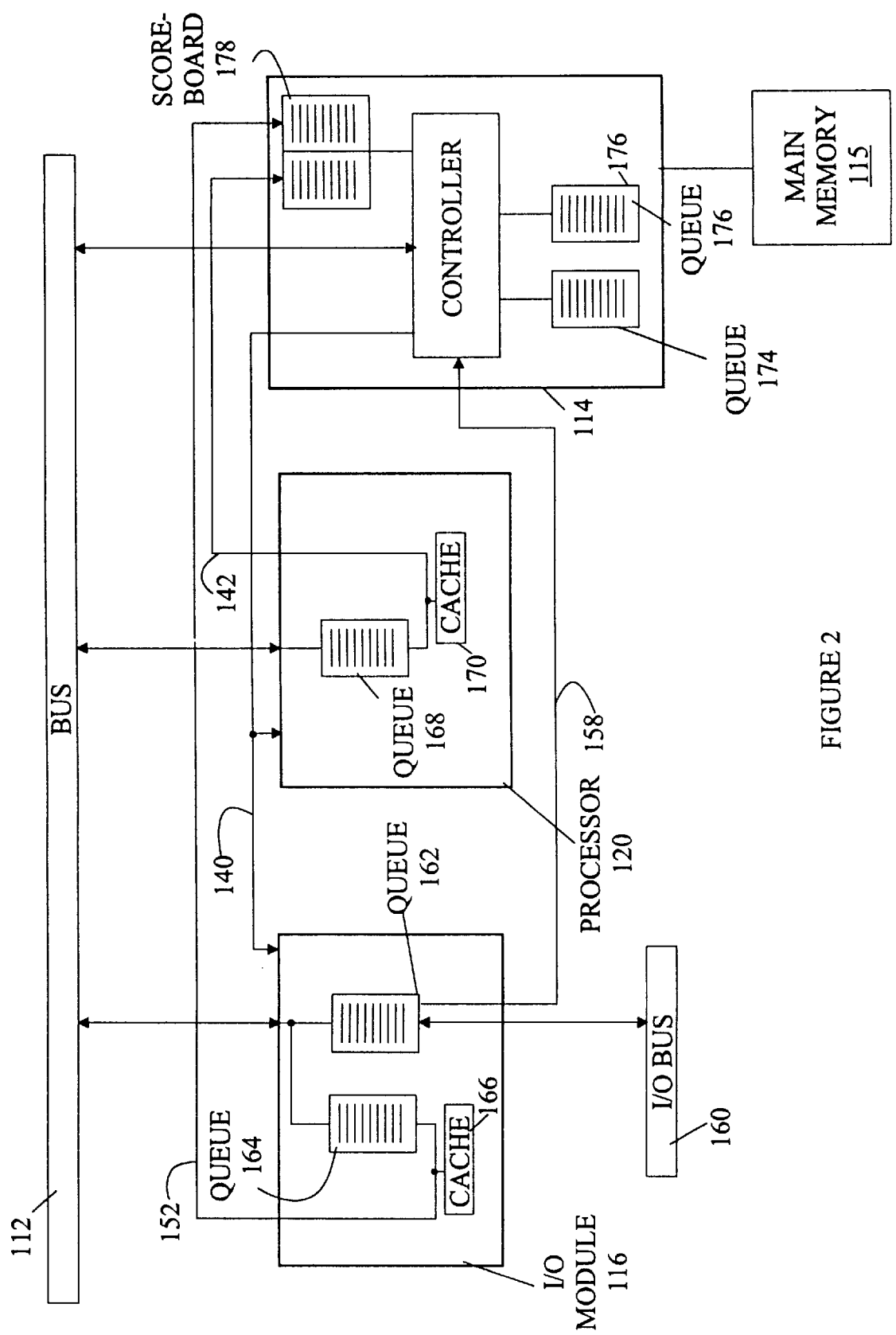
FIG. 2 is a block diagram illustrating computer system components and queues for use with a flow control mechanism according to the present invention.

Referring now to FIG. 2, the operation of a computer system having a flow control mechanism according to the present invention will be further described. FIG. 2 shows key elements of a computer system 100, which elements correspond functionally to elements described in connection with computer system 10 and FIG. 1. Computer system 100 comprises a bus 112, a main memory controller 114 coupled to main memory 115, an input/output module 116, a processor module 120, a CLIENT_OP line 140, coherency "COH" lines 142 and 152, and STOP_IO line 158. These elements correspond, respectively, to bus 12, main memory controller 14, input/output module 16, processor module 20, CLIENT_OP line 40, COH lines 42 and 52, and STOP_IO line 58, which were described in connection with FIG. 1. The aspects of these elements and their interrelationship that were described in connection with FIG. 1 will not be repeated here.

For clarity of explanation, FIG. 2 shows only one processor module and one input/output module. It is to be understood that, in a preferred implementation, additional processor modules identical to module 120 and additional input/output module identical to module 116 are coupled to bus 112 in the manner shown in FIG. 1.

Aside from those elements described in connection with FIG. 1, computer system 100 includes an input/output bus 160 coupled to input/output module 116 in a conventional manner. Input/output module 116 also includes an input/output queue 162, a CCC queue 164, and a memory cache 166. Processor module 120 additionally includes a CCC queue 168 and a memory cache 170. Main memory controller 114 includes a arbitration processor 172, a memory read queue 174, a memory write queue 176, and a scoreboard 178. It is understood that the processor and input/output modules not shown each contain elements identical to those of processor module 120 and input/output module 116, respectively.

In operation, coherent transactions issued by an input/output module or processor module are transmitted on bus 112. The coherent transaction is detected by each module and placed in the CCC queue of each client module and on scoreboard 178. In FIFO order, coherent transactions stored in CCC queues 164 and 168 are checked against memory caches 166 and 170, respectively, and the results are reported to main memory controller 114 on lines 152 and 142, respectively. The results are stored on the scoreboard until all modules have reported for the transaction in question. Main memory controller 114 compares the number of coherent transactions responded to on lines 152 and 142 against the number of coherent transactions listed in scoreboard 178 to determine the full/empty status of CCC queues 164 and 168.

For example, a coherent memory read issued on bus 112 will be detected by modules 116 and 120 and placed in their CCC queue for a coherency check. The results of the coherency checks will be reported to main memory controller 114 indicating that neither module has a private dirty copy of the data. When all modules have reported, main memory controller 114 provides the requesting module with the data, and indicates on its scoreboard that each module has responded to that coherent transaction and marks this line of the scoreboard as being free for use by an incoming transaction.

Input/output transactions, such as a write to an input/output device are funneled through input/output queue 162 to input/output bus 160. Input/output module 116 monitors the status of input/output queue 162 and, when input/output queue 162 is critically full, input/output module 116 reports this information to main memory controlled 114 on line 158. For example, if a processor module is busy writing data to input/output module 116, transactions may fill up queue 162, causing issuance of a STOP_IO signal. Main memory controller 114 will issue a NO_IO client option signal.

Main memory controller 114 also monitors the status of its own memory queues, queue 174 and queue 176, which are preferably a memory read queue and a memory write queue. Thus, main memory controller 114 has information concerning the full/empty status of all queues within computer system 100 that could otherwise overflow. If it detects that its memory queue is critically full, it issues a NONE_ALLOWED client option signal. As the previously-issued memory transactions are processed, the memory queue will begin to empty and a more permissive client option signal can be issued.

More generally, based on the information available to main memory controller 114 on the full/empty status of all queues, processor 172 within main memory controller 114 determines what types of transactions can be issued in the next available cycle without any of the queues overflowing. As explained above, processor 172 determines which CLIENT_OP signal should be issued such that only transactions that will not cause any of the queues to overflow are permitted during the next available bus cycle. As explained above, the winner of the arbitration will only issue transactions which are permitted by the CLIENT_OP signal. Thus, there is never a need to abort any transactions and there is no need for handshaking among modules.

For example, assume input/output queue 162 is close to becoming critically full. Input/output module 116 is busy receiving data. Another write to an input/output device is sent on bus 112 to input/output mode 116 and placed in input/output queue 162. Detecting that queue 162 is critically full, input/output module 116 sends a STOP_IO signal to main memory controller 114. Input/output queue 162 continues to receive transactions for several cycles until main memory controller 114 drives a NO_IO client option signal in response to the STOP_IO signal. Based on the NO_IO client option signal, the next bus owner will not drive any transactions to input/output devices.

As a further example, main memory controller 114 may detect (using its scoreboard) that one or more coherency queues is becoming critically full. Main memory controller 114 will drive a RET_ONLY client option signal. The bus owner will not drive any further coherent transactions. However, data returns and coherency check responses will be allowed. Thus, the CCC queues will eventually begin emptying, and a more permissive client option signal will be issued.

The terms "bus(es)" and "line(s)" have both been used in this detailed description to denote various sets of one or more electrical paths that are more fully described above. It will be appreciated by those skilled in the art that the terms "bus" and "line" are not intended to be mutually exclusive or otherwise limiting in themselves. For example, while the term "LONG_TRANS bus" has been used, it is clear that the LONG_TRANS bus may consist of a conventional shared line; that is, a single electrical path along which signals can be sent by more than one module. Similarly, the terms "CLIENT_OP bus" and "CLIENT_OP lines" have been used interchangeably to denote a set of hardware lines driven only by the host, as described more fully above.

Various modifications to the present invention will become apparent to those skilled in the art from the foregoing description and accompanying drawings. Accordingly, the present invention is to be limited solely by the scope of the following claims.

What is claimed is:

1. A data processing system comprising:

a bus having a plurality of signal conductors for transmitting information between physically separated locations;

a plurality of modules coupled to said bus, each module comprising means for transmitting and receiving information specifying a transaction to be carried out by another module or by said module, respectively, each module further comprising a queue for storing information specifying said transaction received by said module for processing by said module;

a bus controller, separate from said modules for generating a signal on said bus indicative of the types of said transactions that can be sent on said bus by said modules;

means, separate from said modules, for determining that a queue in one of said modules has less than a predetermined amount of free space and for causing said bus controller to limit transactions that can be sent on said bus so as to prevent transactions requiring space in said queue from being issued, said determining means making said determination without reference to any signal from that module indicating the amount of free space in said queue.

2. The data processing system of claim 1 wherein at least one of said modules further comprises:

a memory;

means for detecting a coherent transaction on said bus, said coherent transaction requiring a check for the existence of a specified word in said memory and the status of said word, and for causing information specifying said check to be stored in said queue included in said module;

means for checking said memory for the presence and status of said data word specified in said coherent transmission; and means for transmitting signals indicating the result of the last of said checks performed by said checking means; and wherein said determining means further comprises means for receiving said transmitted signals from each module performing said checks.

3. The data processing system of claim 1 wherein at least one of said modules comprises means for determining the amount of space in said queue in that module; and means for generating and transmitting a signal to said bus controller indicating that said determined amount of space is less than a predetermined amount.

* * * * *